United States Patent Office  
3,280,130  
Patented Oct. 18, 1966

3,280,130  
PROCESS FOR THE PREPARATION OF SULFO-BETAINES OF HETEROCYCLIC BASES OF THE AROMATIC TYPE  
Wolfgang Gündel, Dusseldorf-Oberkassel, Germany, assignor to Dehydag Deutsche Hydrierwerke G.m.b.H., Dusseldorf, Germany, a corporation of Germany  
No Drawing. Filed July 18, 1963, Ser. No. 296,104  
Claims priority, application Germany, July 21, 1962,  
D 39,427  
10 Claims. (Cl. 260—286)

This invention relates to new sulfobetaines of heterocyclic bases containing oxy groups and to the method for obtaining them.

It has been found that novel, useful sulfobetaines of heterocyclic bases containing oxy groups are obtained when unsubstituted or substituted heterocyclic bases of the aromatic type, that is, those in which the tertiary nitrogen atom is a part of an aromatic system, are reacted in the presence of water and in the presence of an agent capable of tying up bases with epichlorohydrin, and in the quaternary salts formed thereby and containing chlorine in organic linkage are thereafter reacted with salts of sulfurous acid.

The method of formation and the structure of these sulfobetaines are illustrated by the reaction equations given below, which relate to the illustrative case wherein in a first reaction step water-containing pyridine is reacted with epichlorohydrin in the presence of a hydrochloric acid as the agent capable of tying up bases, and thereafter in a second reaction step, the quaternary salt formed thereby is reacted with sodium sulfite:

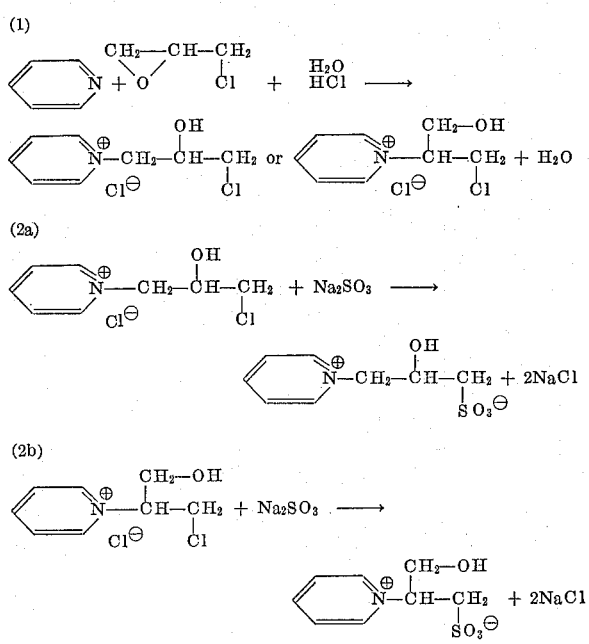

It is therefore an object of this invention to obtain new sulfobetaines of heterocyclic bases containing oxy groups.

This and other objects of my invention will become apparent as the description thereof proceeds.

The performance of the process depends, as we have determined, to a decisive extent upon the condition that the free ammonium bases initially formed are saturated immediately after their formation. Under the conditions of the first reaction step the organically bonded chlorine atom apparently very readily splits off, so that completely different, to a large extent undefinable, products are formed when the reaction is performed without the saturation of the free ammonium bases. As we have discovered, the reaction proceeds exclusively in the sense of the above indicated reaction equations when the ammonium bases initially formed are continuously neutralized by concurrent use of an agent capable of tying up bases.

In practice, the reaction is advantageously performed by dissolving or suspending pyridine or one of its derivatives in water and, after addition of a few drops of a phenolphthaleine solution, adding an equimolar amount of epichlorohydrin. As soon as the mixture begins to turn reddish—which is the case, as a rule, after only a few moments—the addition of an aqueous mineral acid of known concentration is begun, and this addition of mineral acid is then continuously maintained depending upon the progress of the reaction so that the hydrogen ion concentration of the mixture remains between pH 7 and pH 8 and never exceeds a pH value of 8, which may readily be recognized with the aid of the indicator that has been added or may readily be accomplished by using a continuously indicating pH measuring device. The temperature, which slowly increases during the reaction, is maintained at 40° C. by occasional cooling, and the reaction has gone to completion and has been properly performed when almost exactly one equivalent of acid has been introduced without having the pH of the reaction mixture change into the acid range toward the end of the addition. When particularly reactive pyridine bases are used, it has proved to be advantageous to provide a portion of the required amount of acid, for instance, one-half of one, together with the base, that is, to introduce a substantial portion of the base into the reaction in the form of a salt. By virtue of this measure the hydrogen ion concentration practically controls itself within the desired range at the beginning of the reaction. No change occurs thereby in the overall course of the reaction, as it is shown in reaction Equation 1 above, because the free quaternary base which is formed takes up the acid bonded to the pyridine base because it is the stronger base, and releases the pyridine base for further reaction. This measure also offers an additional advantage when pyridine derivatives which are difficultly soluble in water are employed, some of which are soluble in the concentrated aqueous solutions of their own salts and in this form are more readily accessible for the reaction.

For transformation into the sulfobetaines according to the present invention pursuant to the reaction Equation 2 above, an equivalent amount of a neutral sulfite, possibly dissolved in a small amount of water, is added to the completely reacted, weakly alkaline reaction mixture; for reasons of economy, commercial grade crystallized sodium sulfite is used as a rule for this purpose, and the mixture is then heated for several hours accompanied by stirring to temperatures up to about 100° C. until practically no sulfite can any longer be detected.

For isolation of the sulfobetaines formed thereby, it is preferred that the reaction mixture is first dehydrated in vacuo and the residual dry crystalline mass is subsequently treated with an organic solvent at elevated temperatures for the purpose of separating the inorganic salts contained therein. For this purpose lower alcohols are preferred, such as ethyl alcohol, isopropyl alcohol, and especially methanol, from which the difficultly soluble sulfobetaines—presumably those which are formed according to reaction Equation 2a above—crystallize to a major extent upon cooling while the remaining amount inclusive of the more readily soluble sulfobetaines formed according to reaction Equation 2b above may be recovered by evaporation.

It has further been found that sodium bisulfite or sodium pyrosulfite or another acid salt of sulfurous acid may also be used with particular advantage as the agent capable of tying up the base, and that in this case no further addition of sulfite is required for performance of the subsequent sulfobetaine reaction. In this manner it is possible to combine both of the partial reactions into practically a single step, which proceeds pursuant to the following equation for the illustrative case given in column 1:

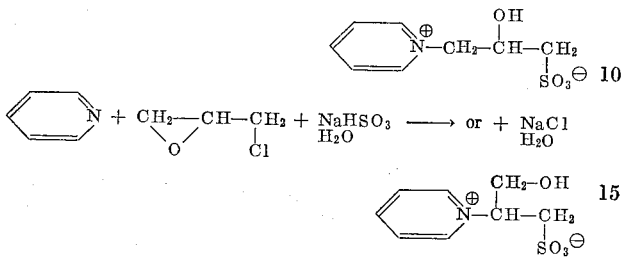

The conditions in this embodiment of the process, which furnishes products with a lower salt content, are practically the same as above and are explained in greater detail in one of the subsequent examples.

Both of the above described embodiments are capable of general application inasmuch as not only pyridine but other heterocyclic bases of the aromatic type are accessible to this reaction or sequence of reactions. Examples of suitable heterocyclic bases are pyridine, 3-chloro-pyridine, 4-chloro-pyridine, 2-methyl-pyridine, 3-methyl-pyridine, 4-methyl-pyridine (picoline), 2-ethyl-pyridine, 3-ethyl-pyridine, 4-ethyl-pyridine, 2,3 or 2,4 or 2,5 or 2,6 or 3,5-dimethyl-pyridine (lutidine), 2 - methyl - 5 - ethyl-pyridine, 4-methyl-3-ethyl-pyridine, 4-isopropyl-pyridine, 4-tertiary butyl-pyridine, 2,3,4 or 2,4,6-trimethyl-pyridine (collidine), 2,4 or 3,4-diethyl-pyridine, 3,5-dimethyl-2-ethyl-pyridine, 2,6-dimethyl-4-ethyl-pyridine, and also polycyclic bases such as quinoline, 2-chloro-quinoline, 3-bromo-quinoline, 2-methyl-quinoline (quinaldine), 4-methyl-quinoline (lepidine), isoquinoline, and the like.

Primarily suitable as agents capable of tying up bases are mineral acids of all types, such as hydrochloric acid, sulfuric acid, phosphoric acid, and the like, or acid salts such as sodium bisulfate, which because of the ease with which they can be separated are as a rule used when it is desired to obtain salt-free end products. However, organic carboxylic acids or sulfonic acids may also be employed, such as formic acid, acetic acid, propionic acid, hydroxy-propane-sulfonic acid, toluene-sulfonic acid, and the like. In accordance with the special embodiment of the process, acid salts of sulfurous acid are used as agents for tying up bases, preferably potassium or sodium bisulfite or potassium or sodium pyrosulfite, whereby the second process step can be practically combined with the first process step.

The sulfobetaines obtainable pursuant to the present invention are colorless, satisfactorily crystallizing compounds which are very readily soluble in water to give a neutral solution but in most instances difficultly soluble in organic solvents. Methanol serves well as the crystallization medium for their recovery in the pure state. The sulfobetaines are useful additives for electroplating baths, especially for acid nickel baths, in which they produce outstanding leveling effects together with known brightening agents; furthermore, they can be used as inhibitors.

The following specific examples are presented to illustrate the invention and to enable persons skilled in the art to better understand and practice the invention and are not intended to be limitative.

*Example I*

A few drops of phenolphthaleine solution and 46.2 parts by weight of epichlorohydrin (0.5 mol) were added to a vigorously stirred mixture of 39.5 parts by weight of pyridine (0.5 mol) and 80 parts by volume of water. As soon as the color of the reaction mixture changed to red—which usually occurs immediately—the addition of 2 N hydrochloric acid was begun and it was continuously added pursuant to the requirements of the process of the reaction so that the alkalinity always remains in the range of the turning point and so that the mixture never turns red. The temperature, during that time, was allowed to rise up to 40° C. and is then maintained at that level. If this operation is conscientiously performed, it is possible to add practically the entire theoretically possible amount of 2 N sulfuric acid (250 parts by volume—0.5 mol) without the reaction changing into the acid range.

After the permissible amount of hydrochloric acid was added, the reaction mixture was stirred for an additional period of time and then solid, crystallized sodium sulfite was added in an amount which was equivalent to the amount of hydrochloric acid that has been added, that is, at a maximum 126 parts by weight (0.5 mol). After six hours of heating to 90–100° C. the reaction mixture was evaporated—advantageously under reduced pressure—to dryness, and the sulfobetaine formed by the reaction was separated from the concurrently formed sodium chloride by repeated boiling with portions of 500 parts by volume of methanol, from which the sulfobetaine crystallized in ample quantity and practically free from sodium chloride in the form of thin, colorless leaflets. 47.5 parts by weight were obtained and by evaporating the mother liquors additional amounts were recovered, so that the total yield was above 70% of theory. For further purification the product was recrystallized from a small amount of glacial acetic acid. The sulfobetaine obtained in this manner may be employed in electroplating as an additive to nickel baths.

When 0.4 gm. of the above described sulfobetaine was added per liter as a leveling agent to a Watts type nickel bath containing as a brightening agent 3 gm./liter of di-tolyl-disulfimid-sodium, ductive mirror bright nickel electrodeposits which require no further polishing were obtained by electroplating iron or copper sheets at 60° C. and at a medium current density of about 60 amp./dm.$^2$.

*Example II*

Using a procedure corresponding to Example I, but substituting 46.5 parts by weight of methyl-pyridine (0.5 mole) in place of pyridine, and controlling the reaction in corresponding fashion and working up the reaction mixture in the same way, a crystallizate was obtained after evaporation from which the sulfobetaine can be substantially extracted by prolonged and when necessary repeated, boiling with about 500 parts by weight of methanol. For purification the raw product was recrystallized from 50 times the amount of ethanol, yielding about 44 parts by weight which corresponds to the yield of 38% of theory. Additional yields can be obtained by working up the methanolic mother liquors.

Similar to the above described product, the sulfobetaine obtained in this manner may be used as a leveling agent in acid nickel electroplating baths in amounts of 0.25–10 gm./liter and under customary conditions, for instance, under the conditions described in German Patent 1,004,011.

*Example III*

After addition of a few drops of phenolphthaleine solution to a mixture of 39.5 parts by weight of pyridine (0.5 mol) and 80 parts by weight of water, 46.2 parts by weight of epichlorohydrin (0.5 mol) were added. As soon as the color of the vigorously stirred mixture tends to turn red, the addition of a sodium pyrosulfite solution which contains 47.5 parts by weight (0.5 mol) of this salt in 250 parts by volume was begun. The sulfite solution was added as described in the preceding examples, that is, pursuant to the progress of the reaction so that the pH always remained in the range of the turning point and a pH value of 8 was not exceeded. When the slowly increasing temperature was maintained at 40° C., the addition of the total amount of sulfite solution was terminated in about 30 minutes. After additional stirring for a short period of time, the reaction mixture was heated for six hours at 90° C., evaporated, and the residual colorless crystalline mass was exhaustively extracted with methanol from which the sulfobetaine can be isolated with good yields by the procedure described in Example I.

*Example IV*

2 N hydrochloric acid was added slowly at 40° C. and accompanied by vigorous stirring to a mixture of 64.5 parts by weight of isoquinoline (0.5 mol), 125 parts by weight of water, and 46.25 parts by weight of epichlorohydrin (0.5 mol), namely, at such a rate that the hydrogen ion concentration of the mixture did not exceed the value of pH 8 as continuously indicated by an electrometric pH measuring device. After addition of a total of 250 parts by volume of acid (0.5 mol), for which about four hours were necessary, the reaction had gone to completion. Thereafter, 126 parts by weight of crystallized sodium sulfite (0.5 mol) were dissolved in the mixture and the entire batch was heated for three hours at 85° C. The inner salt of isoquinolinium-N-hydroxy-propane-sulfonic acid which had crystallized out of the solution by the next day was separated by vacuum filtration and the mother liquor was concentrated by evaporation and was again allowed to stand for crystallization. The total yield was 80.7 parts by weight, which corresponds to a raw yield of 60.5% of theory. For purification the raw product is advantageously dissolved in three times the amount of water and the hot solution is admixed with ten times its amount of methanol. The sulfobetaine which crystallized out was analytically pure and melted at 278–280° C. accompanied by decomposition.

While certain specific examples and preferred modes of practice of the invention have been set forth it will be understood that this is solely for the purpose of illustration and that various changes and modifications may be made without departing from the spirit of the disclosure and the scope of the appended claims.

I claim:
1. Process for the preparation of sulfobetaines containing hydroxy groups which comprises (1) reacting an aromatic heterocyclic base selected from the group consisting of pyridine, halogenated pyridine, lower alkylated pyridine, quinoline, halogenated quinoline and lower alkylated quinoline, with epichlorohydrin, in the presence of water, and under the addition of an agent capable of tying up bases selected from the group consisting of mineral acids, salts of mineral acids, organic carboxylic acids and organic soulfonic acids to form a quaternary salt containing chlorine in organic linkage, said agent capable of tying up bases being added at such a rate that the reaction mixture is maintained at a pH between 7 and 8 and (2) subsequently reacting said quaternary salt with an alkali metal salt of sulfurous acid.

2. The process of claim 1, wherein said alkali metal salt of sulfurous acid is sodium sulfite.

3. The process of claim 1, wherein the mineral acid is hydrochloric acid.

4. The process of claim 1, wherein the aromatic heterocyclic base is pyridine.

5. The process of claim 1, wherein the aromatic heterocyclic base is methyl pyridine.

6. The process of claim 1, wherein the aromatic heterocyclic base is isoquinoline.

7. The process of claim 1, wherein the agent for tying up bases is provided in part by using salts of the aromatic heterocyclic bases as part of the starting material.

8. Process for the preparation of sulfobetaines containing hydroxy groups which comprises, reacting an aromatic heterocyclic base selected from the group consisting of pyridine, halogenated pyridine, lower alkylated pyridine, quinoline, halogenated quinoline, and lower alkylated quinoline, with epichlorohydrin, in the presence of water, and under the addition of an acid alkali metal salt of sulfurous acid at such a rate that the reaction mixture is maintained at a pH between 7 and 8.

9. The process of claim 8, wherein said acid salt is sodium bisulfite.

10. The process of claim 8, wherein said acid salt is sodium pyrosulfite.

References Cited by the Examiner

UNITED STATES PATENTS

| | | | |
|---|---|---|---|
| 2,146,646 | 2/1939 | Nusslein et al. | 260—243 X |
| 2,761,866 | 9/1956 | Goldberg et al. | 260—294.8 |
| 3,023,151 | 2/1962 | Strauss et al. | 204—49 |
| 3,054,733 | 9/1962 | Heiling | 204—49 |
| 3,109,846 | 11/1963 | Klass et al. | 260—294.8 |
| 3,131,189 | 4/1964 | Klass | 260—286 X |

FOREIGN PATENTS

| | | |
|---|---|---|
| 795,417 | 1/1936 | France. |
| 482,515 | 3/1938 | Great Britain. |

ALEX MAZEL, *Primary Examiner.*

NICHOLAS S. RIZZO, WALTER A. MODANCE, HENRY R. JILES, *Examiners.*

ROBERT T. BOND, JAMES M. FORD, D. G. DAUS, *Assistant Examiners.*